(12) United States Patent
Hoysall et al.

(10) Patent No.: US 12,061,050 B2
(45) Date of Patent: Aug. 13, 2024

(54) HEAT RECOVERY VENTILATOR

(71) Applicant: Carrier Corporation, Palm Beach Gardens, FL (US)

(72) Inventors: Dhruv Chanakya Hoysall, West Hartford, CT (US); Abbas A. Alahyari, Glastonbury, CT (US); Jack Leon Esformes, Jamesville, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/972,201

(22) PCT Filed: Nov. 6, 2019

(86) PCT No.: PCT/US2019/060062
§ 371 (c)(1),
(2) Date: Dec. 4, 2020

(87) PCT Pub. No.: WO2020/097199
PCT Pub. Date: May 14, 2020

(65) Prior Publication Data
US 2021/0254901 A1 Aug. 19, 2021

Related U.S. Application Data

(60) Provisional application No. 62/756,858, filed on Nov. 7, 2018.

(51) Int. Cl.
*F28D 19/04* (2006.01)
*B21D 53/04* (2006.01)
(52) U.S. Cl.
CPC .......... *F28D 19/041* (2013.01); *B21D 53/04* (2013.01)

(58) Field of Classification Search
CPC ....... F28D 19/041; F28D 19/042; F28D 19/00
(Continued)

(56) References Cited

U.S. PATENT DOCUMENTS 1,762,446 A    6/1930  Ljungstrom
3,415,502 A *  12/1968 Munsters ................. B01J 19/32
                                             261/DIG. 11
(Continued)

FOREIGN PATENT DOCUMENTS

DE    2706139 A1   8/1978
DE    3011210 A1   10/1981
(Continued)

OTHER PUBLICATIONS

International Search Report for International Application No. PCT/US2019/060062; International Filing Date: Nov. 6, 2019; Date of Mailing: Mar. 19, 2020, 5 pages.
(Continued)

*Primary Examiner* — Jon T. Schermerhorn, Jr.
(74) *Attorney, Agent, or Firm* — CANTOR COLBURN LLP

(57) ABSTRACT

A heat recovery wheel for a heat exchanger includes a wheel rim defining an outer perimeter of the heat recovery wheel, and a plurality of wheel passages located between the wheel rim and the wheel axis. The plurality of wheel passages are arranged in a plurality of radial layers relative to a wheel central axis. Each layer is defined by a first shaped material having a first cross-sectional shape and a second shaped material assembled to the first shaped material, the second shaped material having a second cross-sectional shape. Radially adjacent layers of the plurality of layers are secured directly to one another, and the plurality of wheel passages are configured for flow of a first airflow and a second airflow (Continued)

therethrough for thermal energy exchange between the first airflow and the second airflow.

8 Claims, 6 Drawing Sheets

(58) Field of Classification Search
USPC .................................................. 165/5
See application file for complete search history.

(56) References Cited

U.S. PATENT DOCUMENTS

| | | | |
|---|---|---|---|
| 3,534,807 A | 10/1970 | Bracken, Jr. | |
| 3,800,515 A * | 4/1974 | Asker | F28F 25/08 |
| | | | 55/498 |
| 4,084,633 A * | 4/1978 | Strindehag | F28D 19/042 |
| | | | 165/8 |
| 4,180,126 A * | 12/1979 | Rush | F24F 3/1423 |
| | | | 165/59 |
| 4,246,962 A * | 1/1981 | Norback | F24F 3/147 |
| | | | 165/166 |
| 4,542,782 A * | 9/1985 | Berner | F28D 19/042 |
| | | | 165/8 |
| 4,561,492 A | 12/1985 | Bellows | |
| 5,167,879 A * | 12/1992 | Streng | B01J 19/32 |
| | | | 261/112.2 |
| 5,183,098 A | 2/1993 | Chagnot | |
| 5,771,707 A * | 6/1998 | Lagace | F28D 19/042 |
| | | | 62/271 |
| 9,404,689 B2 | 8/2016 | Hakbijl et al. | |
| 9,448,015 B2 | 9/2016 | Seebald | |
| 9,644,899 B2 | 5/2017 | Cowburn et al. | |
| 2010/0218927 A1 | 9/2010 | Cooper et al. | |
| 2012/0305217 A1 * | 12/2012 | Cowburn | F28D 19/044 |
| | | | 165/170 |
| 2014/0352345 A1 * | 12/2014 | Hakbijl | F24F 3/14 |
| | | | 29/890.035 |
| 2016/0040939 A1 * | 2/2016 | O'Boyle | F28D 19/042 |
| | | | 165/8 |
| 2017/0102193 A1 | 4/2017 | Atkinson et al. | |
| 2018/0216897 A1 * | 8/2018 | Robinson | F24F 12/001 |

FOREIGN PATENT DOCUMENTS

| | | |
|---|---|---|
| EP | 1884732 A2 | 2/2008 |
| GB | 2183811 A | 6/1987 |
| JP | 2000171184 A | 6/2000 |
| JP | 2003200223 A | 7/2003 |
| KR | 100757954 B1 | 9/2007 |

OTHER PUBLICATIONS

Written Opinion for International Application No. PCT/US2019/060062; International Filing Date: Nov. 6, 2019; Date of Mailing: Mar. 19, 2020, 7 pages.

Ciofalo, M. et al. "Investigation of flow and heat trasnfer in corrugated passages-II. Numerical simulations", Int. J. Heat Mass Transfer, 1996, vol. 39, No. 1, 28 Pages.

Fodemski, T.R. et al. "Corrugated Channels Heat Transfer Efficiency Analysis Based on Velocity Fields Resulting From Computer Simulation and PIV Measurements", Paper presented at the 8th International Conference on Heat Transfer, Fluid Mechanics and Thermodynamics, Mauritius, Jul. 11-13, 2011. 10 Pages.

* cited by examiner

HEAT RECOVERY VENTILATOR

CROSS REFERENCE TO RELATED APPLICATIONS

This application is a National Stage application of PCT/US2019/060062, filed Nov. 6, 2019, which claims the benefit of U.S. Provisional Application No. 62/756,858 filed Nov. 7, 2018, the disclosures of which are incorporated herein by reference in their entirety.

BACKGROUND

Exemplary embodiments pertain to the art of heat exchangers, and more particularly to rotary wheel heat recovery ventilators.

Heat exchangers are utilized in ventilation systems installed in, for example, residential, commercial and industrial spaces to extract and remove heat and/or moisture from one airstream and transfer that heat energy and/or moisture to a second airstream. In particular, rotary wheel heat exchangers, or heat recovery ventilators, are known wherein a wheel rotates in a housing through countervailing streams of exhaust and fresh air, in the winter extracting heat and moisture from the exhaust stream and transferring it to the fresh air stream. In the summer rotary wheel heat exchangers extract heat and moisture from the fresh air stream and transfer it to the exhaust stream, preserving building air conditioning while providing desired ventilation.

Heat transfer enhanced heat recovery wheels present an opportunity for the development of significantly more compact designs of ventilation systems, reducing material and fabrication cost. However, a number of challenges exist for the application of new designs: Wheel effectiveness, pressure drop, material cost and design complexity are some of the key challenges.

BRIEF DESCRIPTION

In one embodiment, a heat recovery wheel for a heat exchanger includes a wheel rim defining an outer perimeter of the heat recovery wheel, and a plurality of wheel passages located between the wheel rim and the wheel axis. The plurality of wheel passages are arranged in a plurality of radial layers relative to a wheel central axis. Each layer is defined by a first shaped material having a first cross-sectional shape and a second shaped material assembled to the first shaped material, the second shaped material having a second cross-sectional shape. Radially adjacent layers of the plurality of layers are secured directly to one another, and the plurality of wheel passages are configured for flow of a first airflow and a second airflow therethrough for thermal energy exchange between the first airflow and the second airflow.

Additionally or alternatively, in this or other embodiments the first cross-sectional shape is the same as the second cross-sectional shape.

Additionally or alternatively, in this or other embodiments the first cross-sectional shape is different from the second cross-sectional shape.

Additionally or alternatively, in this or other embodiments the first cross-sectional shape is a first chevron pattern.

Additionally or alternatively, in this or other embodiments the first cross-sectional shape is a first trapezoidal pattern.

Additionally or alternatively, in this or other embodiments the first cross-sectional shape has a first angular alignment relative to the wheel central axis and the second cross-sectional shape has a second angular alignment different from the first angular alignment.

Additionally or alternatively, in this or other embodiments the first cross-sectional shape is circumferentially angularly offset from the second cross-sectional shape.

Additionally or alternatively, in this or other embodiments the heat recovery wheel includes a plurality of axially stacked layers of wheel passages relative to the wheel central axis, wherein the wheel passages of axially adjacent layers are circumferentially offset.

In another embodiment, a heat exchanger includes a housing. The housing defines a first airflow chamber through which a first airflow is directed and a second airflow chamber through which a second airflow is directed. A heat recovery wheel is positioned in the housing and is rotatable about a wheel axis. The heat recovery wheel includes a wheel rim defining an outer perimeter of the heat recovery wheel and a plurality of wheel passages located between the wheel rim and the wheel axis. The plurality of wheel passages are arranged in a plurality of radial layers relative to a wheel central axis. Each layer is defined by a first shaped material having a first cross-sectional shape and a second shaped material assembled to the first shaped material. The second shaped material has a second cross-sectional shape. Radially adjacent layers of the plurality of layers are secured directly to one another and the plurality of wheel passages are configured for flow of a first airflow and a second airflow therethrough for thermal energy exchange between the first airflow and the second airflow.

Additionally or alternatively, in this or other embodiments the first cross-sectional shape is the same as the second cross-sectional shape.

Additionally or alternatively, in this or other embodiments the first cross-sectional shape is different from the second cross-sectional shape.

Additionally or alternatively, in this or other embodiments the first cross-sectional shape is a first chevron pattern.

Additionally or alternatively, in this or other embodiments the first cross-sectional shape is a first trapezoidal pattern.

Additionally or alternatively, in this or other embodiments the first cross-sectional shape has a first angular alignment relative to the wheel central axis and the second cross-sectional shape has a second angular alignment different from the first angular alignment.

Additionally or alternatively, in this or other embodiments the first cross-sectional shape is circumferentially angularly offset from the second cross-sectional shape.

Additionally or alternatively, in this or other embodiments a plurality layers of wheel passages are axially stacked relative to the wheel central axis. The wheel passages of axially adjacent layers are circumferentially offset.

In another embodiment, a method of forming a heat recovery wheel includes forming a first cross-sectional shape in a first material layer, forming a second cross-sectional shape in a second material layer, assembling the first material layer directly to the second material layer thereby defining a passage layer having a plurality of wheel passages, and winding the passage layer about a central wheel axis, with radially adjacent passage layers directly abutting.

Additionally or alternatively, in this or other embodiments the first material layer is angularly offset from the second material layer.

Additionally or alternatively, in this or other embodiments radially adjacent passage layers are circumferentially offset.

Additionally or alternatively, in this or other embodiments the first cross-sectional shape is different from the second cross-sectional shape.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
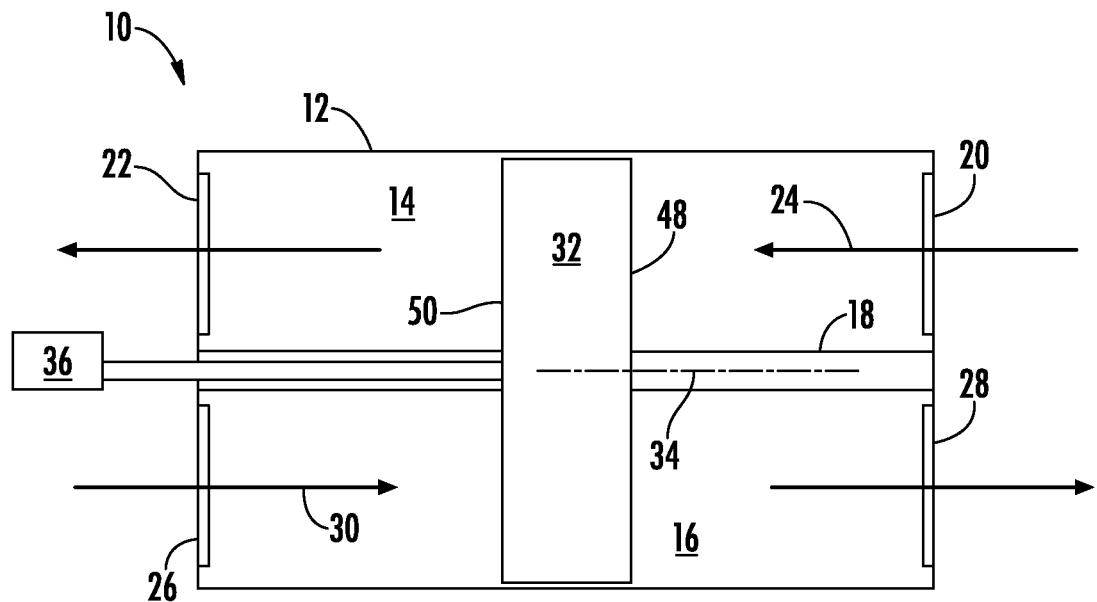
FIG. 1 is a schematic view of an embodiment of a heat recovery ventilator.
Figure 2:
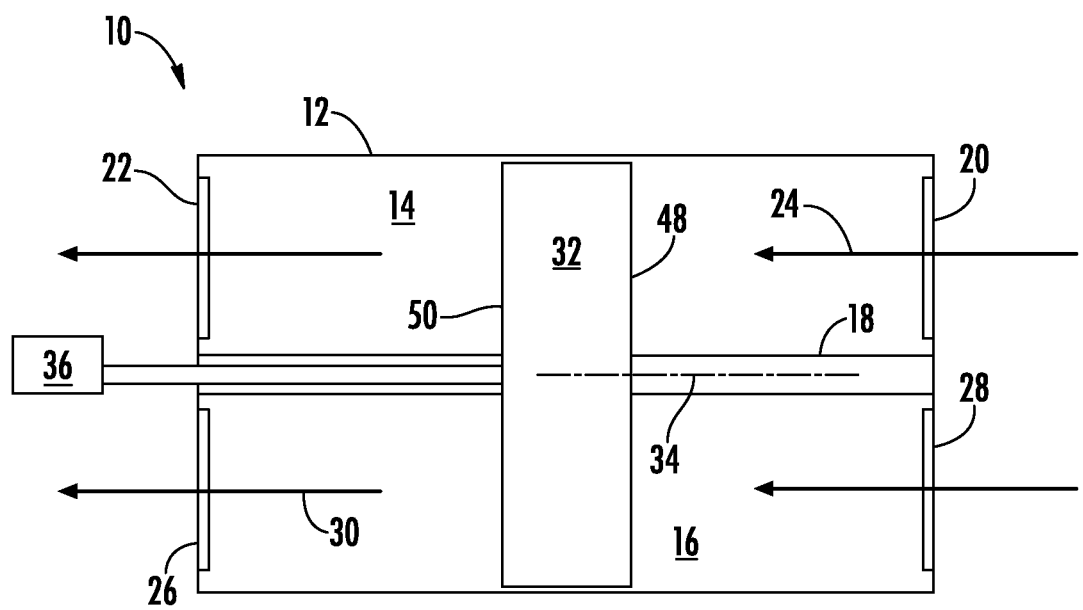
FIG. 2 is a schematic view of another embodiment of a heat recovery ventilator.

Referring now to FIG. 1, illustrated is a schematic view of an embodiment of a heat recovery ventilator 10. The heat recovery ventilator 10 includes a housing 12 having a first airflow chamber 14 and a second airflow chamber 16. In some embodiments, the first airflow chamber 14 and the second airflow chamber 16 are separated by an internal housing wall 18. The first airflow chamber 14 includes a first inlet port 20 and a first outlet port 22, through which a first airflow 24 is directed through the first airflow chamber 14. Similarly, the second airflow chamber 16 includes a second inlet port 26 and a second outlet port 28, through which a second airflow 30 is directed through the second airflow chamber 16. In some embodiments, the first airflow 24 is, for example, a return airflow from a conditioned or ventilated space, while the second airflow 30 is, for example, a fresh airflow. In the embodiment of FIG. 1, the first airflow 24 and the second airflow 30 are directed through the first airflow chamber 14 and the second airflow chamber 16, respectively, in opposite directions, while in another embodiment, such as schematically illustrated in FIG. 2, the first airflow 14 and the second airflow 16 are directed through the first airflow chamber 14 and the second airflow chamber 16, respectively, in the same direction.

Referring again to FIG. 1, a heat recovery wheel 32 is located in the housing 12 and is configured to rotate about a wheel axis 34. The heat recovery wheel 32 rotates continuously about the wheel axis 34, and in some embodiments is driven by a wheel motor 36 operably connected to the heat recovery wheel 32 by, for example, a shaft or belt. With the heat recovery wheel 32 rotating, the first airflow 24 and the second airflow 30 flow through a plurality of wheel passages 38 (shown in FIG. 3) in the heat recovery wheel 32. Thermal energy is transferred between the first airflow 24 and the second airflow 30 via the heat recovery wheel 32 structure.

Figure 3:
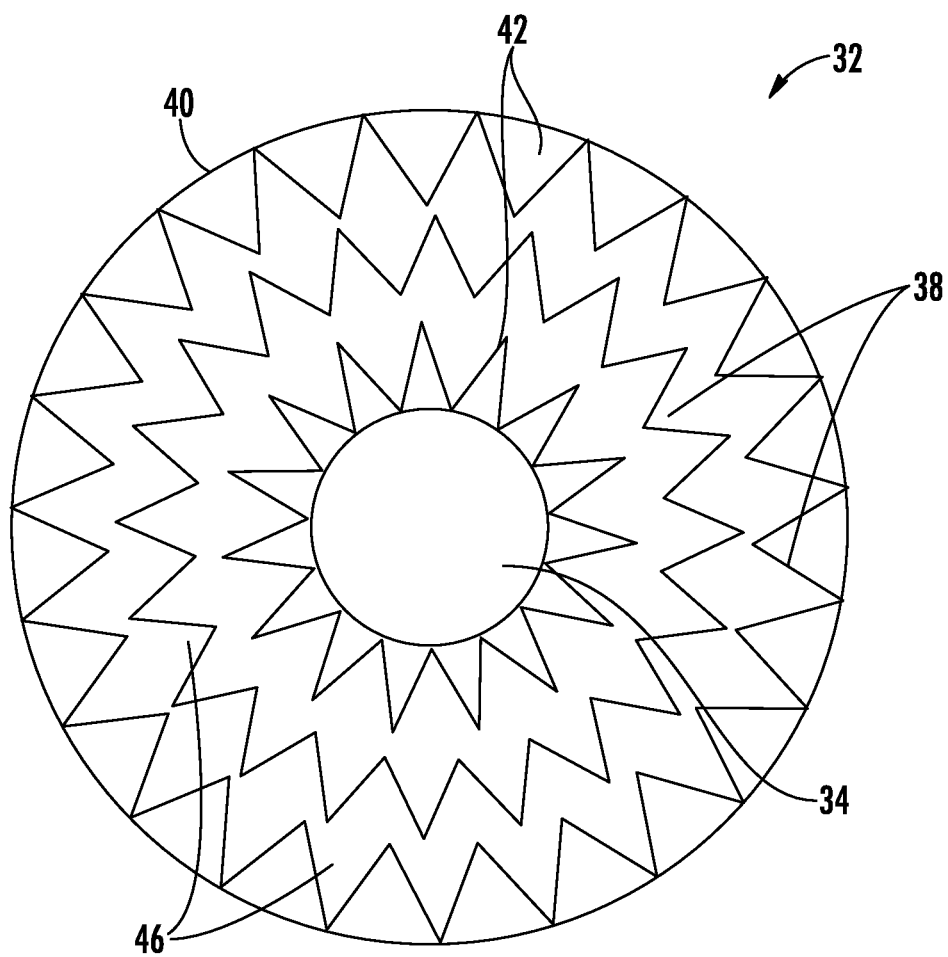
FIG. 3 is a cross-sectional view of an embodiment of a heat recovery wheel for a heat recovery ventilator.

Referring to the cross-sectional view of FIG. 3, the heat recovery wheel 32 includes a wheel outer rim 40 defining an outer perimeter of the heat recovery wheel 32. The plurality of wheel passages 38 are formed in one or more passage layers 42 arranged radially about the wheel axis 34. The passage layers 42 may be formed by generally circular elements, or may be formed in a spiral configuration about the wheel axis 34. The wheel passages 38 of the same passage layers 42 are separated by passage fins 46.

Figure 4:
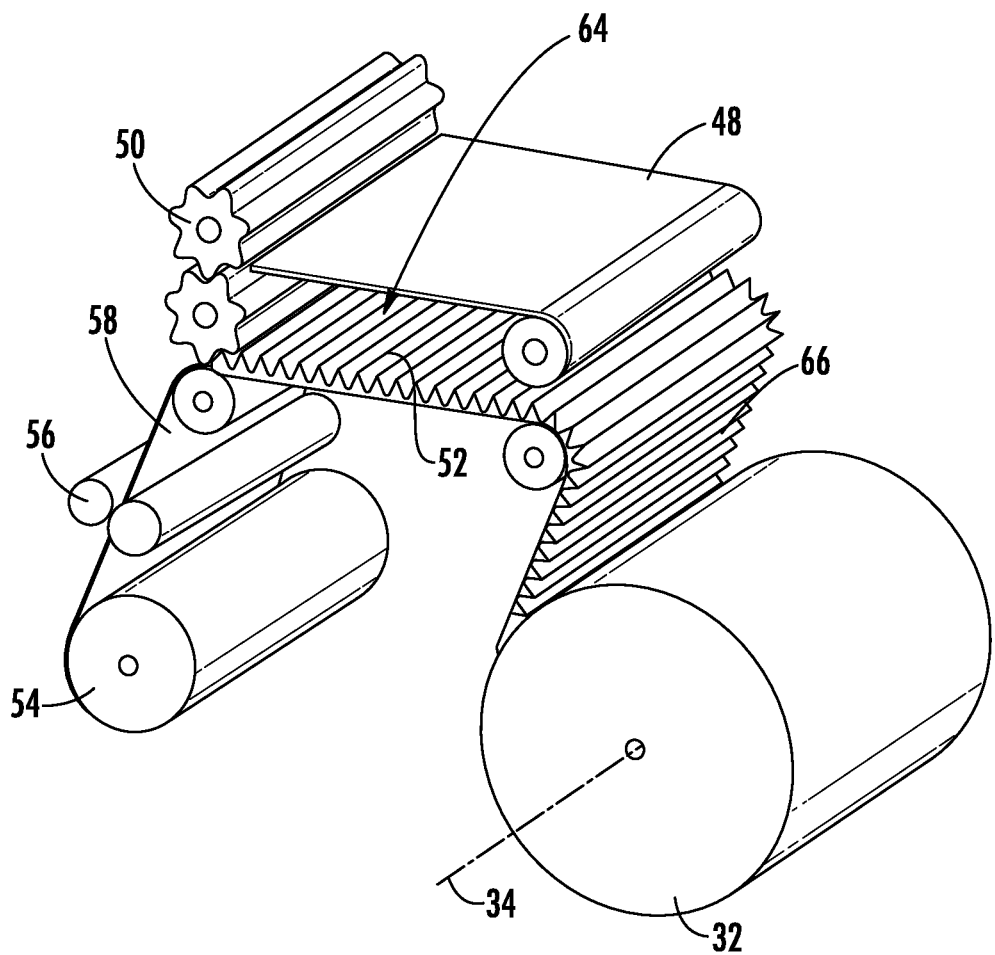
FIG. 4 is a schematic illustration of a method of forming a heat recovery wheel.
Figure 5:
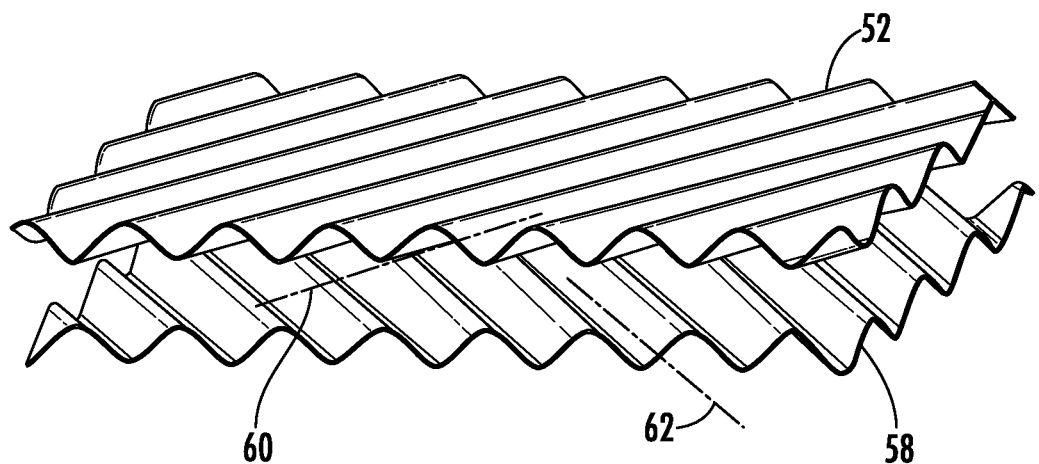
FIG. 5 is a schematic illustration of shaped material sheets for a heat recovery wheel.

Referring now to FIG. 4, a view of a forming process of a heat recovery wheel 32 is shown. A first layer material 48 is fed into a first set of forming rollers 50 or other forming tools at which a first shaped material 52 having, for example, a first chevron pattern as shown in FIG. 5. Referring again to FIG. 4, a second layer material 54 is fed into a second set of forming rollers 56 or other forming tools at which a second shaped material 58 having, for example, a second chevron pattern as shown in FIG. 5. In some embodiments the first chevron pattern is the same as the second chevron pattern, while in other embodiments the second chevron pattern of the second shaped material 58 is different or opposite to the first chevron pattern of the first shaped material 52. In some embodiments, the first chevron pattern is aligned along a first axis 60 and the second chevron pattern is aligned along a second axis 62 offset from the first axis 60. In one embodiment, the second axis 62 is offset from the first axis 60 by 90 degrees.

Figure 6:
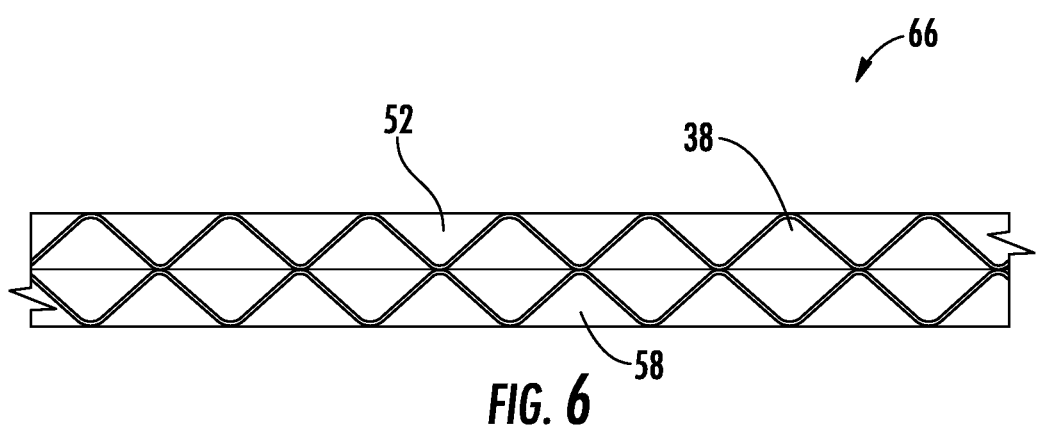
FIG. 6 is a schematic illustration of assembled shaped material sheets for a heat recovery wheel.

The first shaped material 52 and the second shaped material 58 are assembled directly to each other at an assembly section 64 (shown in FIG. 4) to form an assembled sheet 66, as shown in FIG. 6. The assembled sheet 66 has the plurality of wheel passages 38 formed therein by the first chevron pattern and the second chevron pattern. The assembled sheet 66 is wound to produce the heat recovery wheel 32 comprising radially adjacent passage layers 42 directly abutting each other, without a parting element, for example, a parting sheet between the passage layers 42.

Figure 7:
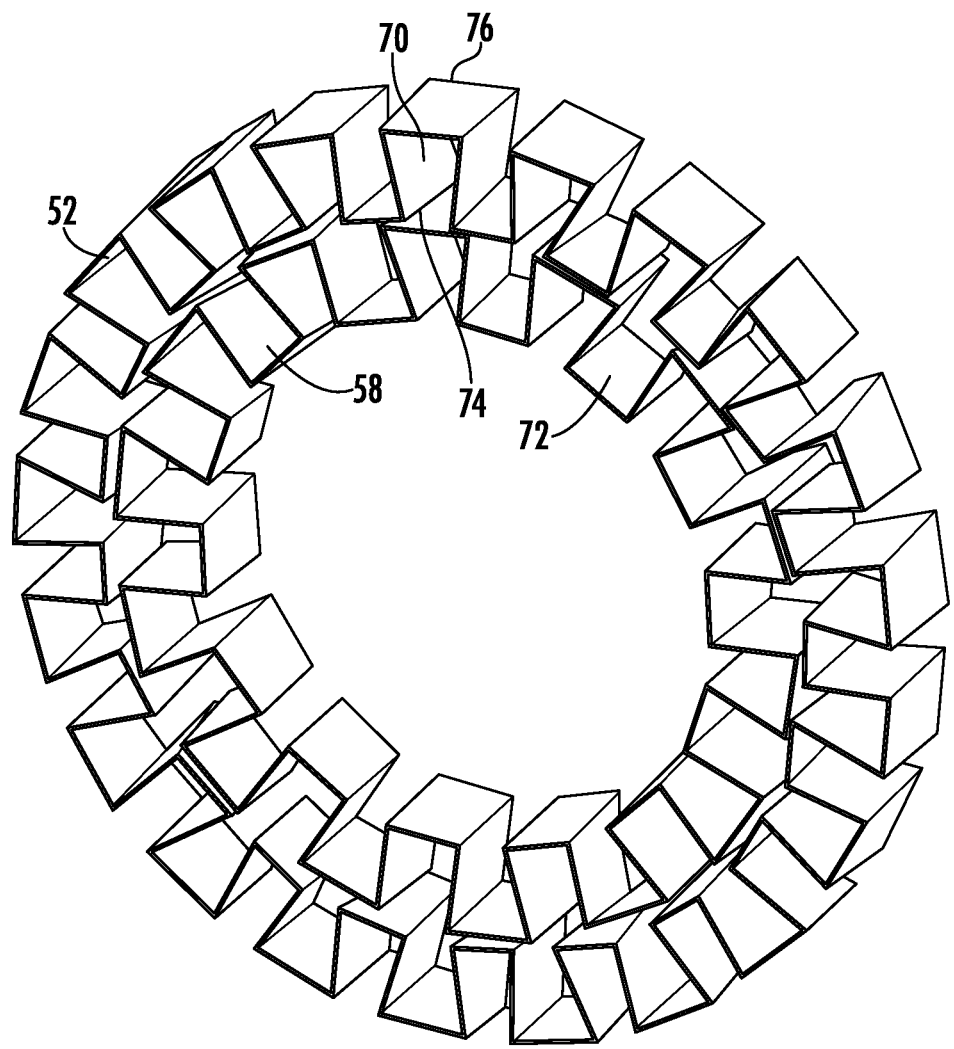
FIG. 7 is a schematic illustration of an embodiment of a heat recovery wheel.

In another embodiment, shown in FIG. 7, the first shaped material 52 and the second shaped material 58 may be formed of other shapes to define the wheel passages 38 when formed into the assembled sheet 66. In the embodiment of FIG. 7, the first shaped material 52 has a first trapezoidal-shaped pattern 70 formed therein, while the second shaped material 58 has a second trapezoidal-shaped pattern 72 formed therein. Each trapezoidal shape has an open end 74 and a closed end 76 opposite the open end 74. In some embodiments, the closed end 76 has a closed end width greater than an open end width of the open end 74.

Figure 8:
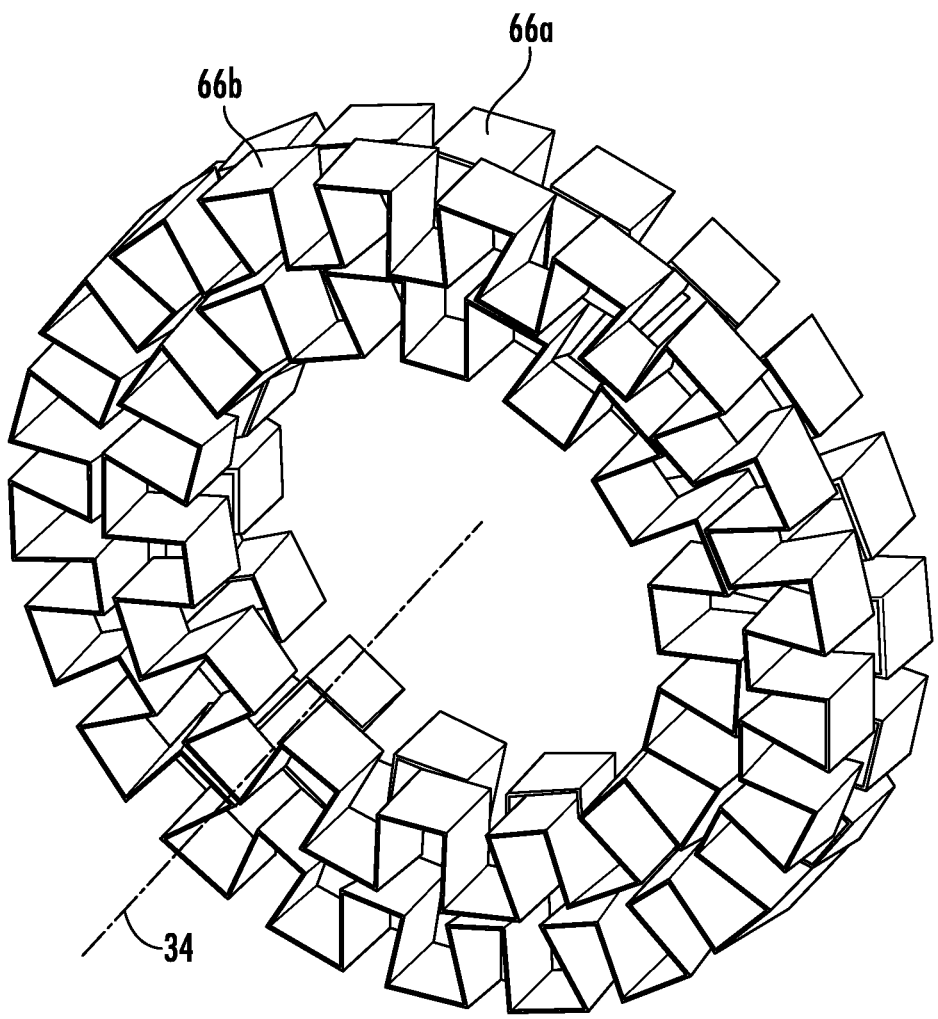
FIG. 8 is a schematic illustration of another embodiment of a heat recovery wheel.

When assembled at the assembly section 64, the first shaped material 52 and the second shaped material 58 are offset such that when wound or rolled to for the heat recovery wheel 32, the first trapezoidal-shaped pattern 70 is angularly offset from the second trapezoidal-shaped pattern 72. Referring now to FIG. 8, in some embodiments, two or more assembled sheets 66 are stacked along the wheel axis 34. In such embodiments, a first assembled sheet 66a is angularly offset from a second assembled sheet 66b.

In some embodiments, the first shaped material 52 and/or the second shaped material 58 may be textured to further enhance heat transfer, and/or may be coated with an adsorbent material for moisture control in the heat recovery ventilator 10. Additionally, the first shaped material 52 and the second shaped material 58 may be coated with a hydrophobic and/or hydrophilic coatings to enhance moisture removal. The first shaped material 52 and the second shaped material 58 may be formed from a metallic material, or alternatively may be formed from a polymer or a composite material.

The first shaped material 52 and the second shaped material 58 and heat recovery wheel 32 of the present disclosure provides a solution to improve heat transfer of the heat recovery wheel 32 while maintaining a compact structure of the heat recovery wheel 32 by not including a parting sheet of a typical heat recovery wheel 32, and not increasing the length of the heat recovery wheel 32 to increase the performance.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A heat exchanger, comprising:
    a housing, the housing defining:
        a first airflow chamber through which a first airflow is directed; and
        a second airflow chamber through which a second airflow is directed; and
    a heat recovery wheel disposed in the housing and rotatable about a wheel axis, the heat recovery wheel including:
        a wheel rim defining an outer perimeter of the heat recovery wheel; and
        a plurality of wheel passages located between the wheel rim and the wheel axis, the plurality of wheel passages arranged in a plurality of radial layers relative to a wheel central axis, each layer defined by:
            a first shaped material having a first cross-sectional shape; and
            a second shaped material assembled to the first shaped material, the second shaped material having a second cross-sectional shape;
        wherein the first shaped material is secured directly to the second shaped material; and
        wherein the plurality of wheel passages are configured for flow of a first airflow and a second airflow therethrough for thermal energy exchange between the first airflow and the second airflow;
        wherein at least one of the first shaped material or the second shaped material includes a hydrophilic coating.

2. The heat exchanger of claim 1, wherein the first cross-sectional shape is the same as the second cross-sectional shape.

3. The heat exchanger of claim 1, wherein the first cross-sectional shape is different from the second cross-sectional shape.

4. The heat exchanger of claim 1, wherein the first cross-sectional shape is a first chevron pattern.

5. The heat exchanger of claim 1, wherein the first cross-sectional shape is a first trapezoidal pattern.

6. The heat exchanger of claim 1, wherein the first cross-sectional shape has a first angular alignment relative to the wheel central axis and the second cross-sectional shape has a second angular alignment different from the first angular alignment.

7. The heat exchanger of claim 1, wherein the first cross-sectional shape is circumferentially angularly offset from the second cross-sectional shape.

8. The heat exchanger of claim 1, further comprising a plurality of axially stacked layers of wheel passages relative to the wheel central axis, wherein the wheel passages of axially adjacent layers are circumferentially offset.

* * * * *